United States Patent

[11] 3,540,540

| [72] | Inventor | Delmar G. Schwab<br>Portland, Oregon |
|---|---|---|
| [21] | Appl. No. | 727,442 |
| [22] | Filed | May 8, 1968 |
| [45] | Patented | Nov. 17, 1970 |
| [73] | Assignee | Hyster Company<br>Portland, Oregon<br>a corporation of Nevada |

[54] COOLING SYSTEM FOR LIFT TRUCKS
17 Claims, 8 Drawing Figs.

[52] U.S. Cl. .................................... 180/68,
236/35
[51] Int. Cl. .................................... B60k 11/04
[50] Field of Search .......................... 180/68,
54.4, 54.3, 54A, 1; 236/35; 280/150E

[56] References Cited
UNITED STATES PATENTS

| 1,754,257 | 4/1930 | Britt | 180/68 |
| 2,256,314 | 9/1941 | Dunham | 180/54(.3) |
| 3,182,912 | 5/1965 | Weisenbach | 236/35 |
| 3,185,242 | 5/1965 | Schwartz et al | 180/54(A) |

*Primary Examiner*—Benjamin Hersh
*Assistant Examiner*—Milton L. Smith
*Attorney*—Buckhorn, Blore, Klarquist and Sparkman ABSTRACT: A cooling system for a lift truck which includes a hydrostatic cooling fan mounted within a duct portion of the counterweight rearwardly of the engine and radiator to draw engine heat through the radiator and dissipate it from the rear of the truck. In one embodiment the fan motor is driven by a fixed-displacement pump and is connected in series with other hydraulic accessories. A thermo modulated pressure-relief valve connected in parallel with the fan motor varies the differential pressure across the fan motor and thus fan speed in response to changes in temperature of transmission oil and largely independently of system pressures and engine speed. In a second embodiment a hydraulic fan motor is driven by a variable pressure-compensated, variable-displacement pump. The motor is connected in series with a thermo modulated pressure-reducing valve and in parallel with other hydraulic accessories of the lift truck to vary fan speed with variations in engine temperature and independently of variations in system pressures and engine speed.

Patented Nov. 17, 1970

DELMAR G. SCHWAB
INVENTOR

BY
BUCKHORN, BLORE, KLARQUIST & SPARKMAN
ATTORNEYS

DELMAR G. SCHWAB
INVENTOR

BY
BUCKHORN, BLORE, KLARQUIST & SPARKMAN
ATTORNEYS

DELMAR G. SCHWAB
INVENTOR

BY
BUCKHORN, BLORE, KLARQUIST & SPARKMAN
ATTORNEYS

COOLING SYSTEM FOR LIFT TRUCKS

BACKGROUND OF THE INVENTION

1. Field of the Invention

The present invention relates to cooling systems utilizing a hydraulic cooling fan and especially to such systems adapted for incorporation in a lift truck or other vehicle wherein multiple hydraulic components including the cooling fan are supplied with fluid from common engine-driven variable or fixed-displacement pump means.

2. Description of the Prior Art

Conventional cooling systems of lift trucks and most other vehicles use a cooling fan which is belt-driven from and mounted on the engine that drives the vehicle so that fan speed varies with engine speed rather than engine temperature. Thus such a cooling system is inherently inefficient. The fan is normally positioned between the engine and the radiator to force engine heat through the radiator. In lift trucks the engine fan and radiator are mounted below and behind the driver station and forwardly of a massive counterweight which extends to the rear end of the vehicle. A large air passage extending rearwardly through the counterweight is required to dissipate engine heat. The radiator must be provided with a large frontal area, and the fan blades must be long to provide the necessary cooling. Because the cooling system components take up considerable space, the mass of counterweight required to give the lift truck its design load capacity can only be obtained by extending the counterweight a considerable distance rearwardly of the radiator. Thus the overall length and turning radius of the truck is determined to a large extent by the required length of the counterweight.

The fan blades of engine-driven cooling fans must be made of metal to have the strength necessary to withstand the rapid and frequent acceleration and deceleration inherent in fans of this type. Metal fan blades produce a high level of noise which can be bothersome to the operator and objectionable in some applications.

Another disadvantage of an engine-mounted fan is that engine vibration causes the fan to vibrate to such an extent that a large clearance must be provided between the tips of the fan blades and their surrounding shrouding, resulting in a further reduction in fan efficiency.

The inherent inefficiencies of an engine-driven cooling fan for vehicles have lead others to experiment with hydraulic motor-driven cooling fans, with the hydraulic motor usually being driven by a pump which is in turn driven by the engine. Most of such systems have utilized a temperature-operated flow control valve or a temperature-regulated variable displacement pump to control flow to the fan motor and thus regulate the speed of the fan motor. However, such prior systems have serious disadvantages, particularly for use in lift trucks. For example, a flow control valve which is responsive only to temperature is not responsive to variations in system flow rates or pressures caused by variations in engine speed, and thus variations in engine speeds still affect the speed of the cooling fan. Most importantly, such temperature-operated systems cannot readily incorporate other hydraulic accessories of a vehicle without the use of such other accessories affecting the speed of the cooling fan.

SUMMARY OF THE INVENTION

The foregoing problems and disadvantages of prior vehicular cooling systems are obviated by the present invention through the provision of a hydraulic motor-driven cooling fan, the speed of which is varied with engine temperature by a thermomodulated differential pressure-regulating valve which controls the differential pressure across the fan motor in response to engine temperature and independently of system pressures upstream or downstream from the motor. Thus fan speed is unaffected by variations in system pressures caused by other hydraulic components in the same system or by variations in engine speed throughout most of the engine's speed range.

The fan is mounted independently of the engine within a small air passage within the lift truck counterweight, and the radiator is interposed between the fan and engine closely adjacent the engine. The fan is designed to draw engine heat through the radiator core and then push the heat through the air passage and out the rear of the truck.

The improved cooling efficiency provided by the foregoing novel hydraulic cooling fan circuit and novel rearrangement of cooling system components enables a reduction in radiator area, fan blade length, fan blade tip clearance, and diameter of the air passage through the counterweight. These factors and the greater compactness of the new combination of cooling system components reduces substantially the volume of space required for the cooling system. As a result, space formerly needed for the cooling system is occupied by counterweight material, thereby enabling a substantial reduction in the overall length and turning radius of the vehicle as well as a more efficient use of engine power. Moreover, because rapid acceleration and deceleration of the fan is eliminated, plastic fan blades are used, reducing appreciably the noise level of the cooling system.

Primary objects of the invention are to provide:

1. a hydraulic cooling system including a cooling fan having a speed variable with system temperature and independently of engine speed throughout the major operating range of the engine;
2. a cooling system as aforesaid including thermomodulated pressure-regulating valve means which controls fan speed by regulating the pressure differential across the fan motor in response to system temperatures;
3. a hydraulic cooling system wherein a hydraulic cooling fan motor may be connected in series or parallel with other hydraulic components producing variable and high system pressures without affecting the speed of the fan;
4. a cooling system for a lift truck providing more efficient engine cooling than prior cooling systems;
5. a cooling system for a lift truck as aforesaid which occupies minimal space;
6. a cooling system for a lift truck as aforesaid which enables reduction in the overall length and turning radius of the truck;
7. a cooling system for an internal combustion engine including a thermomodulated pressure-regulating valve sensitive to transmission oil temperature rather than radiator water, thereby eliminating sealing problems within the valve and the possible intermixing of cooling water with hydraulic oil;
8. a cooling system as aforesaid which is quieter than prior cooling systems; and
9. a cooling system as aforesaid adaptable for use with either a variable-displacement pump or fixed-displacement pump as desired, the former having the advantage of optimum efficiency, the latter having the advantage of maximum economy.

BRIEF DESCRIPTION OF THE DRAWINGS

The foregoing and other objects and advantages of the present invention will become more apparent from the following detailed description which proceeds with reference to the accompanying drawings wherein.

DETAILED DESCRIPTION

Arrangement of Cooling System In Lift Truck

Figure 1:
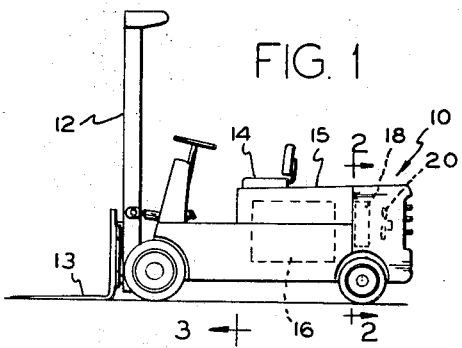
FIG. 1 is a side view of a typical small lift truck incorporating the present invention, with the positions of the engine, radiator and cooling fan indicated in hidden lines.

With reference to the drawings, FIG. 1 discloses a typical lift truck 10 of moderate load capacity including the usual upright 12 at the front of the vehicle mounting a load fork 13 for vertical movement. A driver seat 14 is mounted on the engine compartment 15 of the lift truck body within which an internal combustion engine 16 is housed. Spaced rearwardly of the engine is the engine cooling system including a radiator 18 and cooling fan 20.

Figure 2:
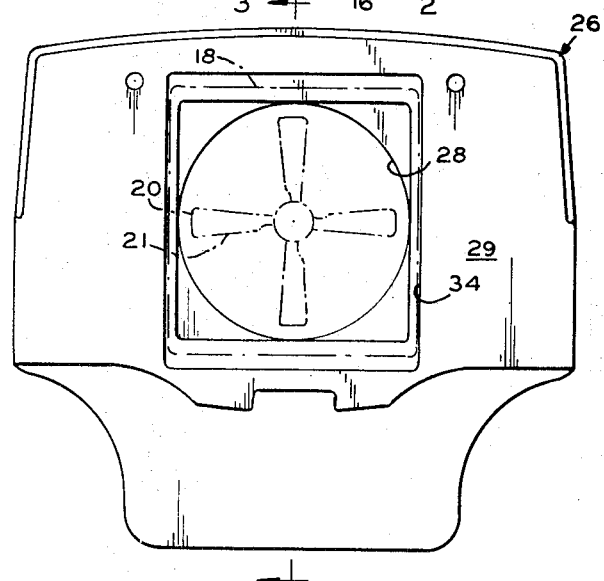
FIG. 2 is an enlarged front view of the counterweight of the lift truck as viewed along the vertical line 2-2 of FIG. 1 and with the positions of the fan and radiator being indicated in dashed lines.
Figure 3:
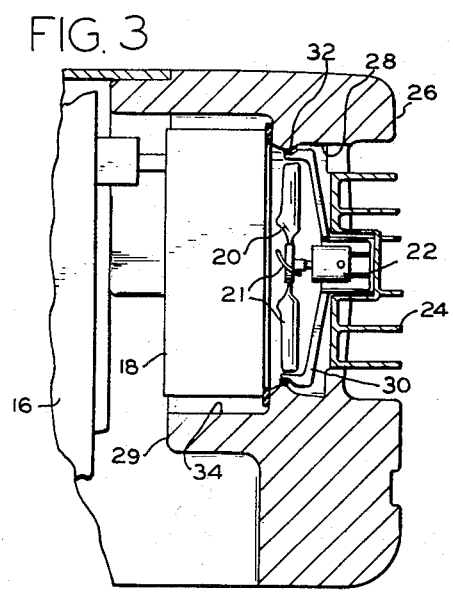
FIG. 3 is a vertical sectional view taken along the line 3-3 of FIG. 2, with the radiator and cooling fan being shown in full lines.

Referring to FIGS. 2 and 3, cooling fan 20 includes nonmetallic puller-type fan blades 21 preferably made of a plastic material to reduce noise level and rotated by a hydrostatic, fixed-displacement motor 22. Hydraulic motor 22 is mounted to a rear heat-dissipating grillwork 24 which in turn is secured to a counterweight portion 26 of the lift truck. The grillwork, fan motor and blades are all mounted within a generally circular air passage 28 which extends rearwardly from a rectangular recess 34 in a frontal portion 29 of the counterweight, which recess receives radiator 18. A fan shroud 30 is mounted within air duct 28 in closely surrounding relationship to the tips of fan blades 21 so as to provide a minimum tip clearance between the blades and the shrouding for maximum cooling fan efficiency. A seal 32 provided between the periphery of the shroud and the inner wall of the air passage prevents leakage of air at this point to provide optimum fan efficiency.

Fan motor 22 is supplied with pressure fluid through hoses (not shown) leading through appropriate passages (not shown) in the counterweight core from a pump (not shown) driven by engine 16. Fan motor 22 is in a hydraulic circuit to be described in detail shortly which rotates the fan blades at speeds dictated by engine temperature rather than by engine speed to provide more efficient use of engine power, more efficient engine cooling and far less rapid and less frequent acceleration and deceleration of the fan blades. The fan blades draw engine-heated air rearwardly through radiator core 18 and push such air through air duct 28 and out through the rear end of the truck.

The mounting of hydraulic fan motor 22 independently of the engine and rearwardly of the radiator core enables mounting of the core closely behind the engine to conserve space and permit placement of counterweight material about the fan and further forward toward the engine than heretofore possible. Use of the temperature-responsive puller-type fan behind the core also reduces the size of the air duct 28 through the counterweight required to conduct air from the engine and radiator, reduces the required frontal area of the radiator core, and reduces the required length of the fan blades as compared with those of prior systems to conserve additional space which is filled with counterweight material. As a result, the distance counterweight 26 extends rearwardly of the engine is significantly reduced, enabling considerable shortening of the overall length and turning radius of the truck.

EXAMPLE

In one prototype truck, use of the described cooling system enabled a 25 percent reduction in radiator frontal area, a 50 percent reduction in peak air flow required, and shortening of the overall length of the lift truck to an extent enabling a 3 inch reduction in the turning radius of the truck. The described arrangement also resulted in a significant reduction in the required length of fan blade from 17 to 14 inches and a reduction in blade tip clearance from three-eighths to one-half inch to one-sixteenth inch. The described cooling system required 3 horsepower to move peak air flows, whereas a conventional lift truck cooling system in a truck of the same capacity requires 8 horsepower to handle peak flows.

Hydraulic Circuitry - Open Center System

FIG. 4 Embodiment

Figure 5:
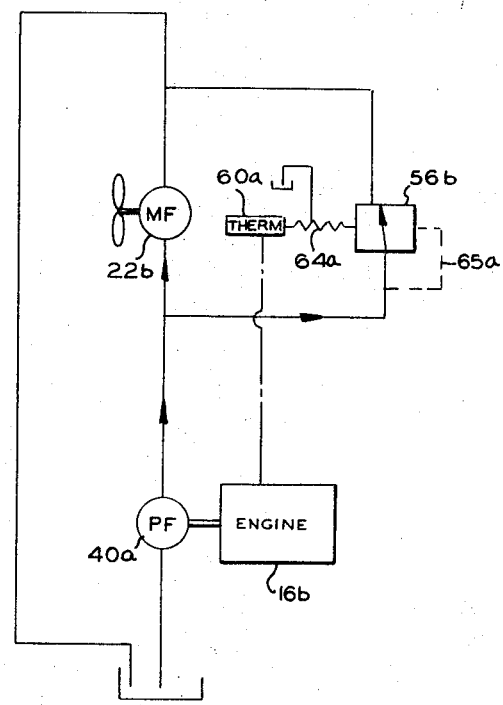
FIG. 5 is a diagram of a modified form of the hydraulic circuit of FIG. 4 in accordance with the invention.
Figure 4:
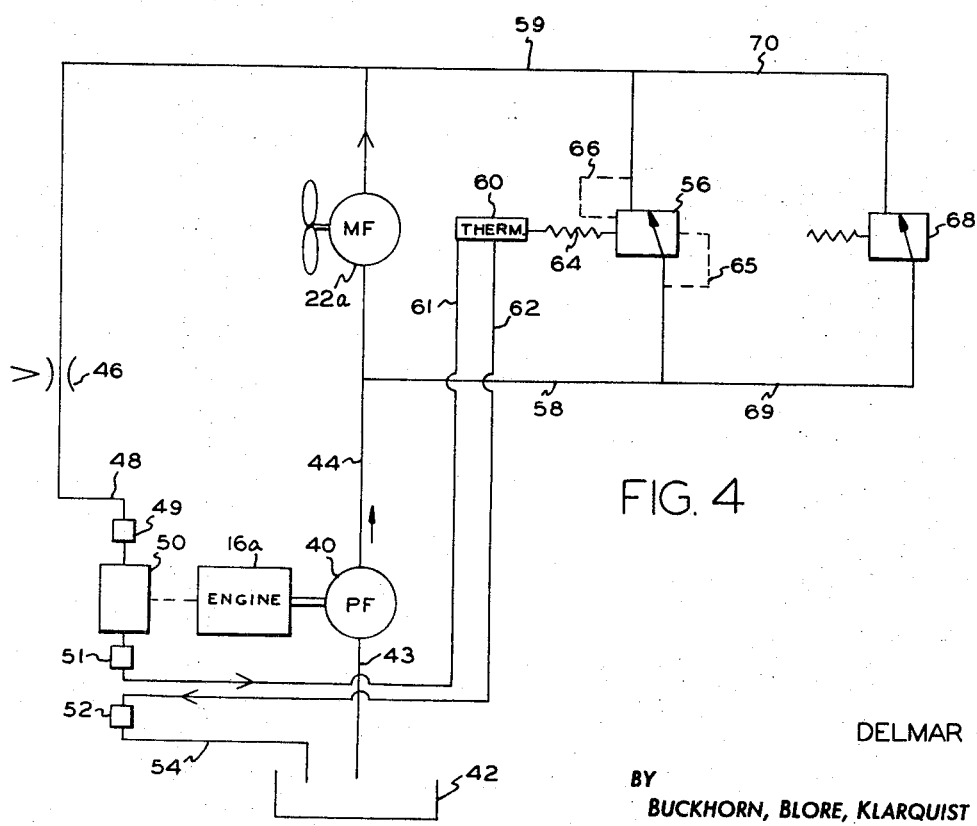
FIG. 4 is a diagram of a hydraulic circuit in accordance with the invention, incorporating a fixed-displacement pump and a pressure-relief valve in parallel with the fan motor.

FIGS. 4 and 5 disclose alternative open center hydraulic circuits within which fan motor 22 may be connected, both such circuits having the advantage that a relatively inexpensive fixed-displacement pump and fixed-displacement motor can be used. The circuit of FIG. 4 has the additional advantage of enabling the cooling fan motor to be connected in series with other hydraulic components of the lift truck such as the lift cylinder, tilt cylinder, steering cylinder or hydraulic transmission, even though such other components demand high system pressures.

With reference to FIG. 4, the illustrated circuit includes a fixed displacement pump 40 driven by internal combustion engine 16a of a lift truck or other vehicle to pump pressure fluid from a sump 42 through a suction line 43 and pressure line 44 to a fixed-displacement hydrostatic cooling fan motor 22a. The fan motor is connected in series with other hydraulic components of the lift truck represented by the variable resistance 46. A portion of the fluid flow is directed through a transmission line 48 and through the transmission elements of the lift truck including a transmission valve 49, torque converter 50, oil cooler 51 and a transmission lubricating and cooling element 52, before the transmission fluid rejoins the main return flow in passage 54 to sump.

A thermomodulated pressure-relief valve 56 is connected in parallel with the fan motor 22a by lines 58, 59 but in series with the other variable resistance elements 46 so as to measure pressure drop across the fan motor. Relief valve 56 includes an expansible thermal element 60 which senses system temperature, in this case the temperature of engine 16a, indirectly by sensing the temperature of transmission oil directed to the thermal portion of the valve 56 through lines 61 and returned to transmission cooling element 52 through line 62. Thermal element 60, through its expansion and contraction with engine temperature, transmits a variable force to a variable pressure-applying spring means 64 to influence the opening and closing of valve 56. Valve 56 is also sensitive to fluid pressures upstream and downstream of the valve through pilot lines 65 and 66. Thus, at any given time the pressure differential across valve 56 will equal the pressure differential across fan motor 22a. Since the pressure drop across valve 56 is controlled by thermal element 60 through spring 64, such element also controls the pressure drop across fan motor 56, and thus the speed of such motor.

The circuit of FIG. 4 also includes a high pressure-relief valve 68 connected in parallel with the fan motor and relief valve 56 by lines 69, 70. Valve 68 overrides relief valve 56 to reduce inlet pressure at the fan motor and thus fan speed regardless of engine temperature in instances of abnormally high system pressures. This might occur, for example, when all or several of the hydraulic components of resistance 46 are being used at once so as to affect the capacity of the engine to drive the lift truck.

Operation of FIG. 4 Embodiment

It is to be understood that FIG. 4 is a simplified schematic diagram showing only the elements of the circuit essential for purposes of understanding the present invention. For example, additional flow-control and pressure-relief devices might be required in conjunction with the various other hydraulic components of the circuit, but these are omitted here for the sake of clarity.

Because the circuit has a fixed-displacement pump, fluid flow will vary with engine speed. Since engine speed changes constantly during operation of the vehicle, flow for purposes of the present circuit is uncontrollable. However, the pressure of oil in the circuit depends on the demands of the circuit. For example, if only the fan motor is used, pump pressure and thus system pressure will be low, but if the other components such as the power steering or lift cylinder is used, pump discharge pressure will be high. The pump is preferably selected so that it is capable of producing sufficient pressures to meet system demands even at low engine speeds and thus low flow.

Valve 56 functions as a pressure-regulating means to regulate pressure differential across the fan motor and thus fan speed. Fan speed is proportional to the square root of the pressure differential across the fan motor (fan speed and flow through the fan motor $=K**\Delta P$). Relief valve 56 performs the demand response function of allowing only enough hydraulic power to the fan motor to perform the necessary cooling. As pump 40 operates, upstream pressure tends to open valve 56 while downstream pressure tends to close it. Since both pressures are acting on equal areas, the result is a pressure differential tending to push the valve open. Because valve 56 is in parallel with the fan motor, this pressure differential is always the same as that across the fan motor. Variable pressure spring 64 opposes the effect of upstream pressure on the valve and thus determines the magnitude of pressure differential necessary to open the valve. In general, as engine temperature rises, the temperature of the transmission oil rises also. expanding thermal element 60 proportionately and thereby compressing spring 64, so that the force applied by the spring tends to close valve 56 to increase the available flow through the fan motor and therefore increase the speed of the fan. Conversely, as the engine temperature drops, the thermal element contracts to relieve compressive force on the spring so that a smaller pressure differential will open the valve and therefore relieve flow to the motor to slow the fan.

From the foregoing it will be apparent that there are three variables in the circuit of FIG. 4 for which relief valve 56 must compensate to make the fan rotate at the desired speed including:

1. variable engine speed, causing variable pump flow;
2. variable resistance to flow of the various hydraulic components of the circuit and therefore variable system pressure or pump discharge pressure; and
3. variable engine temperature.

The operation of valve 56 as it compensates for the above variables is as follows:

EXAMPLE 1

Assume starting conditions including (1) the engine running slowly with the pump moving 3 gallons per minute (g.p.m.), (2) downstream variable resistance components off and downstream resistance 200 p.s.i., and (3) a cold engine. Under such conditions a flow of 3 g.p.m. through the fan motor provides a sufficient fan speed to do the necessary cooling. A 300 p.s.i. pressure drop across the fan motor is necessary to move 3 g.p.m. through it (fan flow and fan speed $=K**\Delta P$). Valve 56 is calibrated so that its thermal element 60, reacting to engine temperature, applies a spring force which will enable a differential pressure at the valve of more than 300 p.s.i. to open the valve. Thus under the existing circumstances valve 56 closes because the pump develops no more than 300 p.s.i. differential pressure across the fan to push the 3 g.p.m. flow through the fan. Total pump discharge pressure developed equals the 300 p.s.i. differential pressure plus the 200 p.s.i. downstream pressure, or a total of 500 p.s.i. discharge pressure.

EXAMPLE 2

Assume now that the operator presses the accelerator and doubles engine speed. A doubled pump flow of 6 g.p.m. results. If all of this increased flow went through the fan, the fan speed would double and pressure drop across the fan motor would increase four times and would thus rise to 1200 p.s.i. However, assuming that the engine is still cold, the valve spring 64 is still set to counteract a pressure drop of only 300 p.s.i. Therefore valve 56 opens and relieves upstream pressure to an extent sufficient to provide only a 300 p.s.i. pressure drop across the valve and thus a 300 p.s.i. drop across the fan motor. Assuming that downstream pressure is still only 200 p.s.i. but now at 6 g.p.m. flow, the pump delivers 6 g.p.m. at the same discharge pressure of 500 p.s.i., with 3 g.p.m. through the fan motor as before and with the remaining 3 g.p.m. flowing through relief valve 56.

EXAMPLE 3

Now assume that one of the downstream hydraulic accessories, such as power steering, is activated to increase downstream pressure to 1200 p.s.i. while engine speed remains the same so that the pump continues to discharge at a rate of 6 g.p.m. The pump must now deliver 6 g.p.m. at 1500 p.s.i. (300 p.s.i. for the fan motor and 1200 p.s.i. for steering). Thus inlet pressure at the fan motor and at valve 56 suddenly increases greatly to 1500 p.s.i. However, since downstream pressure has increased to 1200 p.s.i., the pressure differential across the valve and fan remains exactly the same as before (300 p.s.i.) so that the valve maintains exactly the same throttle opening as before. In other words, insofar as the fan motor and valve 56 are concerned, nothing has changed, and flows through the valve 56 and fan motor and fan speed are maintained at the same levels as in Example 2, despite the fact that the pressure drop is from 1500 p.s.i. to 1200 p.s.i. across the motor and valve rather than 500 p.s.i. to 200 p.s.i.

If valve 56 were an ordinary pressure relief valve sensitive only to upstream pressure, with its spring set to open at a pressure of 300 p.s.i., it would obviously spring wide open under the foregoing condition so that there would be little pressure drop across it, and thus little pressure drop across the fan, resulting in a drastic reduction in fan speed. However, since the valve and fan are sensitive to changes in pressure differential across them rather than to system pressures, the fan continues to operate at the same speed.

EXAMPLE 4

The overriding relief valve 68 is sensitive only to line pressures upstream of the fan motor and is calibrated to open at a predetermined high upstream or pump discharge pressure. As an example, overriding valve 68 might be set to open at a pump discharge pressure of 1900 p.s.i. to limit parasitic power losses of the engine, in which event the valve would be closed at all discharge pressures below 1900 p.s.i. Thus in the previous Example 3 if steering demands should reach 1700 p.s.i., the total system pressure at the pump would be 2000 p.s.i. at 6 g.p.m. Although relief valve 56 strives to ensure that the fan motor has allotted to it a differential pressure of 300 p.s.i. as demanded by engine temperature to drive the fan at a predetermined speed, overriding relief valve 68 overrides valve 56 and permits no more than 1900 p.s.i. to enter the fan. Thus, pressure differential across the fan drops to 200 p.s.i. (1900 p.s.i. −1700 p.s.i.), and fan speed slows to 0.82 of its former speed.

EXAMPLE 5

Assuming that the pump is still discharging at a pressure of 1500 p.s.i. as in Example 3 (300 p.s.i. to the fan motor and 1200 p.s.i. to the steering) at 6 g.p.m (with 3 g.p.m going through the fan and 3 g.p.m. through valve 56), assume also that engine temperature increases to the point where 3.5 g.p.m. flow is needed to pass through the fan motor rather than 3 g.p.m to increase fan speed by one-sixth. Because fan speed and fan flow are proportional to the square root of pressure drop across the fan, and because pressure drop across the fan was 300 p.s.i. at 3 g.p.m., pressure drop across the fan must be increased to 400 p.s.i.

$$\left(\left(\frac{3.5}{3.0}\right)^2 \times 300\right)$$

to obtain 3.5 g.p.m. flow through the fan. Thermal element 60 and spring 64 are calibrated so that engine temperature requiring a fan speed corresponding to 3.5 g.p.m. flow expands the wax and compresses the spring enough to demand 400 p.s.i. pressure differential before opening valve 56 rather than 300 p.s.i. as before. Thus under the increased pressure of spring 64, valve 56 throttles until a 400 p.s.i. differential pressure is recorded across the valve and thus across the fan motor. Under these circumstances the pump continues to deliver 6 g.p.m. and downstream pressure resistance remains at 1200 p.s.i. yet the pump now delivers its 6 g.p.m. at 1600 p.s.i. pressure rather than at 1500 p.s.i. to give the necessary 400 p.s.i. drop across the fan motor. The 400 p.s.i. drop across the fan motor requires a flow of 3.5 g.p.m., and fan speed is correspondingly increased. However, since 3.5 g.p.m. flow now moves through the fan motor, a flow of only 2.5 g.p.m. remains to move through valve 56.

Thermomodulated Relief Valve With Built-in Override

Figure 8:
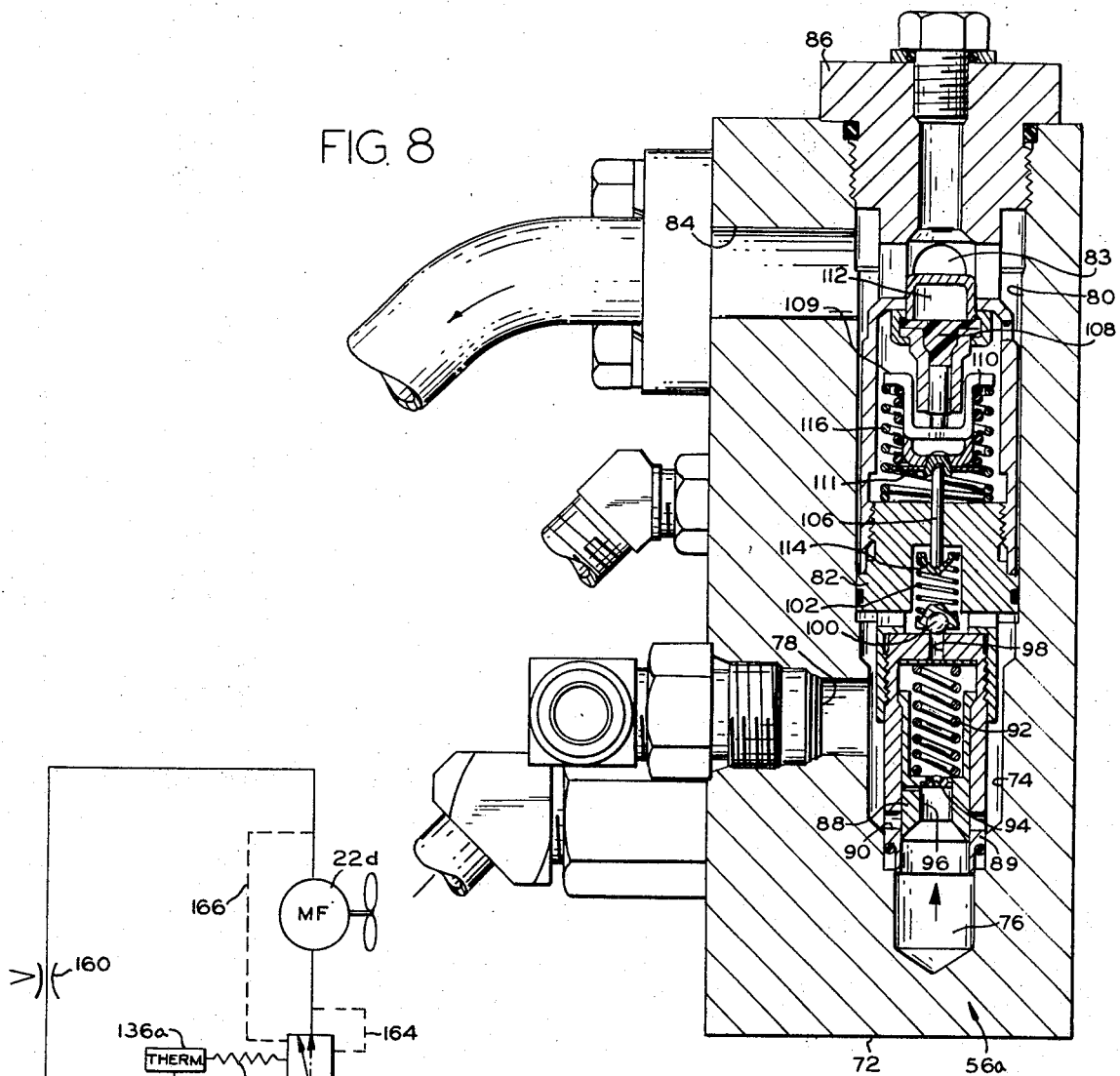
FIG. 8 is a section through a valve block showing in axial section a thermomodulated pressure-relief valve in accordance with the invention of a type suitable for use in the hydraulic circuits of FIGS. 4 and 5.

Referring to FIG. 8 there is disclosed in section a thermomodulated pressure-relief valve 56a corresponding to valve 56 of FIG. 4 with a built-in overriding relief mechanism corresponding to the override valve 68 of FIG. 4. The illustrated valve is suitable for use in the circuits of FIG. 4 and FIG. 5. Valve 56a is incorporated in a valve block 72 which may include other valves such as any flow control, steering or other relief valves required in addition to the basic elements shown in FIG. 4. The valve block has a valve cavity including a first cavity portion 74 into which upstream pressure fluid is admitted through an inlet at 76 and from which fluid is discharged downstream through an outlet section 78. A second cavity portion 80 separated from the first cavity portion by a valve body 82 admits transmission fluid at 83 and discharges it at outlet 84. The cavity is closed by a threaded plug 86 in the top of the valve block.

A primary valve spool 88 slidable up and down within a valve sleeve 89 controls fluid flow from the high pressure side 76 to the low pressure side 78 of cavity 74 through a valve opening 90 to regulate the pressure drop across such opening, which is in parallel with the fan motor. Valve spool 88 is biased downwardly toward a position closing valve opening 90 by a compression spring 92 extending between spool 88 and valve sleeve 89. An internal orifice 94 in spool 88 restricts the flow of pressure fluid through a spool passage 96. Valve sleeve 89 is also provided with an orifice 98 against which a pilot poppet valve member 100 is seated. Poppet 100 is urged toward its seated position by a spring 102 which corresponds to the spring 64 of FIG. 4. A variable pressure is transmitted to the spring by a plunger rod 106 to which force is transmitted from an expansible wax portion 112 of a thermal unit 108 through a U-shaped strip 109, override spring 110 and disc member 111.

Transmission oil is conducted into upper cavity 80 directly from the transmission oil cooler which is dependent upon the engine radiator for its cooling. Thus the temperature of the transmission oil taken at this point is a good indication of engine temperature. Transmission oil temperature is measured rather than radiator water temperature because the use of water could lead to the intermixing of water and oil should a leak develop within the valve.

Expansion of the wax causes the thermal unit to transmit force through strip 109 and spring 110 to plunger 106, which in turn compresses poppet spring 102 to determine the modulating force exerted by the spring against poppet 100. The position of valve spool 88 with respect to valve opening 90 is determined by the pressure drop across the spool's orifice 94, which in turn is determined by the flow permitted through such orifice. This flow in turn is controlled by the flow rate through orifice 98 permitted by pilot poppet 100. Poppet 100 is sensitive not only to variable pressure of spring 102 as determined by the thermal element, but also to the difference in pressure at the upstream and downstream sides of the poppet. Thus poppet 100, controlled by fluid pressure differential and the small thermal element, controls through force amplification the position of the larger spool valve 88. A return spring 116 extends between valve body 82 and strip 109 to ensure relief of pressure on the plunger 106 upon contraction of the thermal element.

Operation of Thermomodulated Valve of FIG. 8

Assuming first that the engine is cold, wax expansion will be at a minimum and thus spring force tending to close poppet 100 is relatively small. Thus a relatively small pressure differential across the poppet opens it substantially to permit an appreciable pilot flow across it. Such pilot flow will cause an increase in pressure differential across spool orifice 94, causing the spool to overcome the pressure of spring 92 and move upwardly to clear opening 90 and permit primary flow through such opening. Since opening 90 is in parallel with the fan motor, flow through such opening relieves upstream pressure at the valve and fan motor to reduce pressure differential across the fan motor and thus fan speed.

Assuming now a high engine temperature and thus a high transmission oil temperature, wax 112 expands to increase the pressure applied by poppet spring 102 on pilot poppet 100. Accordingly, a higher pressure differential across the poppet and thus across the spool and fan motor is now required to permit the same rate of flow through poppet passage 98 as before, and thus across spool orifice 94 to maintain the same pressure differential across such orifice. As a result, poppet 100 closes at least partially to slow pilot flow through the interior of valve spool 88 and thus across spool orifice 94, causing a drop in pressure differential across the orifice and thus a movement of the spool downwardly to restrict flow through opening 90. This forces more flow across the fan motor, thereby increasing pressure drop across the fan motor and increasing fan speed the required amount to give the necessary cooling.

The mechanism of valve assembly 56a performs an overriding relief function as well as the thermomodulated relief function, thus reducing both cost and space requirements. Spring 110 serves as an override spring to give total pressure relief as well as an element in the transmission of thermoinduced pressure to poppet 100. Plunger 106 is connected to spring 110 by disc 111 and has a cross-sectional area which is equal to the cross-sectional area of sleeve orifice 98. Downstream pressure at the upper side of poppet 100 exerts an upward pressure against the plunger at 114 effective over its cross-sectional area while at the same time differential pressure acts on poppet 100 over an equivalent area to transmit an upward force through spring 102 to the plunger. Thus downstream pressure acting at 114 and differential pressure acting on the poppet combine to produce the equivalent of total system pressure acting against the cross-sectional area of the plunger, urging the plunger upwardly against spring 110.

Because spring 110 exerts a force which is independent of the condition of the thermal unit 108, the force of spring 110 is predetermined so that it will be overcome when total system pressure reaches a predetermined maximum, which in the foregoing examples was 1900 p.s.i. Thus when total system pressure reaches 1900 p.s.i., it moves plunger 106 upwardly to relieve the force exerted on poppet 100, regardless of transmission oil temperature and the condition of thermal element 108. When poppet 100 opens orifice 98, a high rate of pilot flow occurs through orifice 98 and therefore across spool orifice 94. This raises the spool and opens primary valve passage 90 to flow, thereby reducing differential pressure across the valve and fan motor to slow the fan speed.

FIG. 5 Embodiment

FIG. 5 illustrates a hydraulic circuit similar to that of FIG. 4 wherein a fixed-displacement pump 40a driven by an engine 16b supplies pressure fluid to a hydrostatic cooling fan motor 22b. However, in FIG. 5 there are no other hydraulic motor components providing a variable resistance in series with the fan motor. A thermomodulated pressure relief valve 56b, including a thermal element 60a and variable pressure applying means 64a is connected in parallel with the fan motor. Valve 56b is sensitive to fluid pressures upstream from the fan motor through pilot line 65a but not to downstream pressure, since downstream pressure remains constant in view of the absence of downstream hydraulic components. Thus, despite the lack of sensitivity to downstream pressure, valve 56b still in effect measures and regulates pressure differential across the valve and fan motor. The operation of valve 56b is the same as described with respect to valves 56 and 56a. The circuit of FIG. 5 does not include an overriding relief valve or overriding relief function within valve 56b. Such an overriding relief valve would be necessary only in cases where total system pressures might reach a point where they would influence the capacity of the motor to drive the vehicle. However, this would not be the case in the circuit of FIG. 5, since there are no fluid motor components other than the fan motor, and the fan motor requires relatively low pressures.

Figure 6:
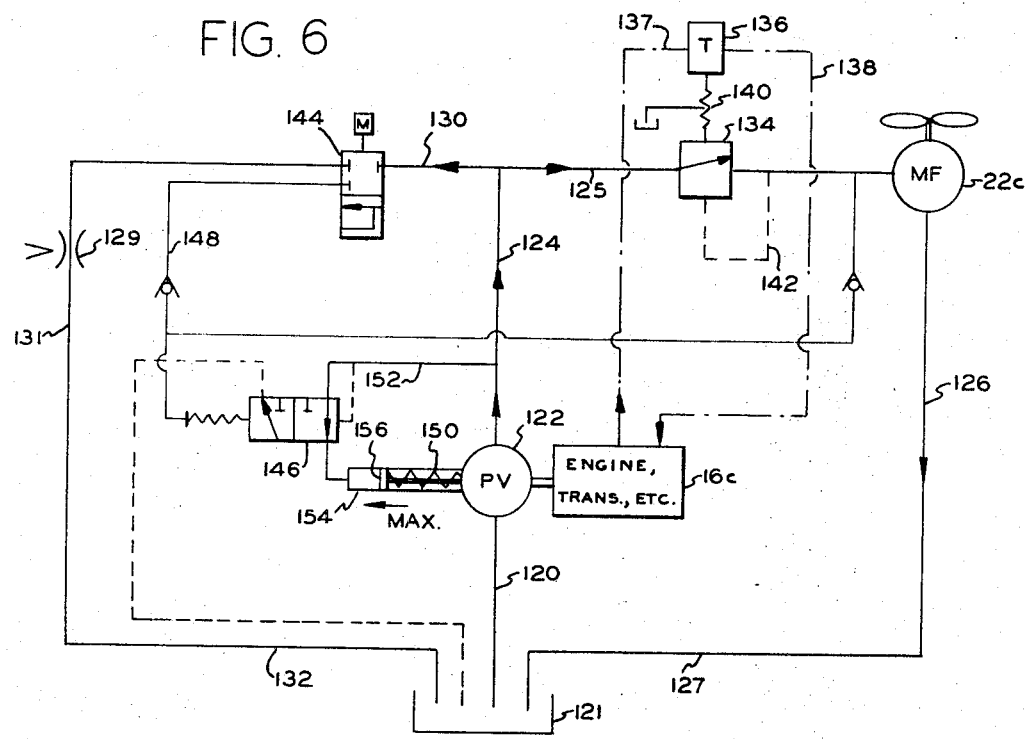
FIG. 6 is a diagram of another hydraulic circuit in accordance with the invention, including a variable-displacement pump and a pressure-reducing valve in series with the fan motor.

Closed Center System
FIG. 6 Embodiment

FIG. 6 illustrates a closed center hydrostatic fan circuit. The basic loop of the circuit includes a suction line 120 leading from a sump 121 to a variable-displacement pump 122 driven by an internal combustion engine 16c and delivering fluid through lines 124 and 125 to a hydrostatic fan motor 22c and thence through return lines 126, 127 back to sump 121. Other hydraulic components such as lift, tilt and steering motors as represented by the variable resistance 129 are connected in parallel with the fan motor 22c by lines 130, 131, 132 leading from line 124 back to sump 121.

Connected in series with fan motor 22c upstream therefrom is a thermomodulated pressure-reducing valve 134 which includes an expansible thermal element 136 sensitive to engine temperatures by means of line 137 and return line 138. The valve is connnected to a variable pressure spring 140 applying a variable pressure as determined by the expansion of thermal element 136 to a movable valve element of valve 134. Valve 134 is also sensitive to the inlet pressure at fan motor 22c through a pilot line 142, with fan motor inlet pressure being balanced against the pressure of spring 140. Valve 134 need only be sensitive to the pressure upstream of the fan motor to effectively measure pressure drop across the motor since pressure downstream of the fan motor is constant, there being no other hydraulic components in series with such motor.

The parallel circuit incorporating the variable resistances includes a manually operated spool valve 144 for selectively permitting flow through the parallel circuit to enable operation of hydraulic components other than the fan motor. Variable-displacement pump 122 is pressure-compensated to deliver a variable flow at a relatively constant pressure, that is, at a pressure within a small pressure range of, for example, 50 p.s.i. of the compensator setting. However, pump 122 is compensated to deliver a relatively constant low pressure when there is flow only through the cooling fan loop of the circuit, but to deliver a relatively constant high pressure when there is flow both through the cooling fan loop and the variable resistance loop, such pressure depending upon the demand of the variable resistance loop. For this purpose a pressure amplifying spool valve 146 operates to change the compensator setting of the pump from a low level as shown to a variably higher level when manual valve 144 is shifted upwardly in FIG. 6. When valve 144 is shifted upwardly, flow through a pilot line 148 to the left-hand side of amplifying valve 146 tends to shift the amplifying valve toward the right, thereby increasing the compensator pressure setting.

Variable pressure-compensated pump 122 includes a pump compensator spring 150 which tends to hold the pump cam plate (not shown) at a maximum displacement angle. Pump output pressure is fed back through line 152 to a cylinder 154 within which a piston 156 which operates the cam plate slides so that pump output pressure is balanced against the pressure of spring 150. Thus when the pump output pressure reaches a preset high pressure of, for example, 900 p.s.i., the pressure compensated piston 156 is moved inwardly against the pump spring 150 by pressure fed to cylinder 154 through line 152 to adjust the angle of the cam plate to reduce pump displacement. Reduction of pump displacement acts to reduce flow and thus reduce pump discharge pressure. Thus, for example, if output pressure reaches 950 p.s.i., pump displacement is reduced to zero and no work is done. Conversely, if pump pressure drops to 850 p.s.i., a drop in pressure at the outer side of piston 156 occurs, and as a result spring 150 urges the piston outwardly to increase displacement until pressure again reaches the predetermined 900 p.s.i. setting. The pump and motor displacements are selected to insure that normal system demand pressures can be maintained independently of the number of demands. The pump normally produces flows at a pressure within the small preset pressure range of, say, 875 to 925 p.s.i. which coincides with its maximum to minimum displacement range. It must be remembered that the pressure compensator setting varies depending on whether just the cooling fan is operating or whether both the cooling fan and other hydraulic accessories are operating. In the foregoing example, the compensator setting would be 900 p.s.i. when only the fan is on, but would be changed to, for example, 2000 p.s.i. when hydraulic steering is activated.

Operation of FIG. 6 Circuit

The circuit of FIG. 6 is shown with valve 144 off so that only the cooling fan is operating. As previously mentioned with respect to the open center circuits of FIGS. 4 and 5, fan speed and fan flow are proportional to the square root of the pressure drop across the fan motor. Thermocontrolled pressure-reducing valve 134 acts to limit the maximum pressure available to the fan motor, and in this way regulates the pressure drop across the fan motor.

As engine temperature increases, thermal element 136 of valve 134 expands to push against valve spring 140, tending to increase the size of the valve opening, thus increasing flow and reducing pressure drop across the valve. As a result, flow to the fan motor and inlet pressure at such motor are increased. The increased force applied by valve spring 140 increases the level of fan inlet pressure that will be required to throttle valve 134. The foregoing in effect reduces pressure drop across the valve and increases pressure drop across the fan to increase fan speed.

As the engine cools, thermal element 136 shrinks, relieving some of the force on valve spring 140 and causing fan inlet pressure acting through pilot line 142 to throttle back valve 134. This increases pressure drop across the valve and thereby decreases pressure drop across the fan to reduce fan speed, remembering that total system pressure at all times is substantially constant. Thus the pressure-reducing valve 134 acts as an automatic throttle to keep the fan motor inlet pressure at a predetermined level as determined by expansion of the thermal element regardless of the inlet pressure at valve 134 and thus independent of the discharge pressure of pump 122 which might be delivering, for example, 900 p.s.i. if only the fan motor is operating, or 2000 p.s.i. if the other hydraulic accessories represented by variable resistance 129 are also operating.

*EXAMPLE 1*

As a first example, assume that all equipment except the fan in FIG. 6 is switched off, as shown. Assume the engine is cold and the fan motor needs only 3 g.p.m. to turn the fan at a speed required to do the necessary cooling. This requires a pressure drop of 300 p.s.i. across the fan motor. The pump delivers fluid at constant pressure of 900 p.s.i. as determined by its compensator. Pressure-reducing valve 134 is calibrated so that at this particular engine temperature the spring applies only enough force to require a 300 p.s.i. fan inlet pressure to cause it to throttle (assuming a fan outlet pressure of 0 p.s.i.). The valve automatically throttles down until it has taken up all but 300 p.s.i. of the 900 p.s.i. total pump pressure available (600 p.s.i.). The pump continues striving to put out only 900 p.s.i. pressure (within 50 p.s.i.). Because no other systems are on, pump displacement is cut back to produce only 3 g.p.m. Any more flow than this would cause line pressure to exceed the predetermined 900 p.s.i. compensator setting.

*EXAMPLE 2*

Now assume the engine gets hotter, requiring a 3.5 g.p.m. flow through the fan motor to produce the necessary increase in fan speed. This requires 400 p.s.i. pressure drop across the fan. The thermal element expands to increase the force applied by spring 140 tending to open valve 134, until the valve is balanced by 400 p.s.i. fan inlet pressure. Since the pump is still pumping only 3 g.p.m., pressure drop across the fan is still only 300 p.s.i. However, because of the larger valve orifice, pressure drop across the valve drops from 600 p.s.i. to a value below 500 p.s.i. Thus, pressure against the pressure-compensator piston 154 drops below 800 p.s.i., causing spring 150 to increase pump displacement until line pressure is again 900 p.s.i. This occurs when pump displacement reaches 3.5 g.p.m., all of which goes through the valve and fan motor to produce the necessary 400 p.s.i. pressure drop across the fan motor and the required increase in fan speed.

EXAMPLE 3

Now assume that engine speed doubles to double pump speed. Pump output will now rise to 7 g.p.m. unless pump displacement is changed. Immediately, pressure drop across both the fan motor and valve 134 increases as the square of flow, and line pressure (the sum of the two pressure drops) is increased four times. However, the increased fan inlet pressure acts to immediately throttle valve 134 to restore the 400 p.s.i. fan inlet pressure. Thus pressure drop across the valve is momentarily very high. However, the greatly increased line pressure immediately pushes on pressure compensator piston 156 to cut back pump displacement until only 3.5 g.p.m. is again flowing, which restores the preset 900 p.s.i. line pressure.

EXAMPLE 4

Now assume that power steering is switched on and the variable pump pressure compensator valve 146 is adjusted so that the pump will not cut back its displacement until line pressure reaches 2000 p.s.i. Because pressure reducing valve 134 limits fan inlet pressure independently of pump pressure, fan speed will not be affected. Valve 134 throttles way down to absorb a 1600 p.s.i. pressure drop and thus maintain fan inlet pressure at 400 p.s.i., assuming engine temperature remains unchanged.

FIG. 7 Embodiment

Figure 7:
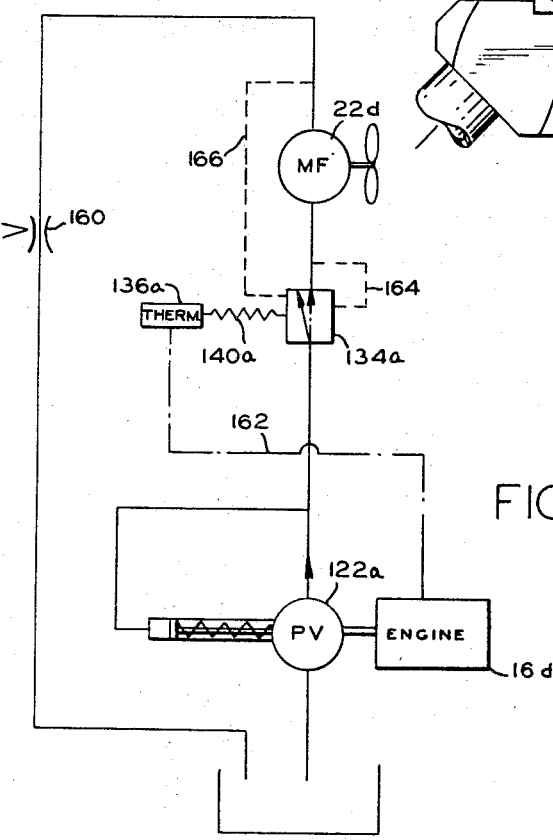
FIG. 7 is a diagram of a modified form of the hydraulic circuit of FIG. 6 in accordance with the invention.

FIG. 7 discloses a closed center hydrostatic cooling fan circuit which is similar in many respects to that of FIG. 6. However, in the circuit of FIG. 7, variable-resistance components 160 are connected in series with the hydrostatic fan motor 22d rather than in parallel, and such components and the fan motor are supplied with hydraulic fluid from a pressure-compensated variable-displacement pump 122a driven by an internal combustion engine 16d to be cooled. A pressure-reducing valve 134a similar to the valve 134 of FIG. 6 is placed in series with the fan motor upstream therefrom and includes thermal element 136a which determines a variable pressure applied by variable-pressure valve spring 140a. Thermal element 136a senses engine temperature through the passage means 162.

However, reducing valve 134a differs from valve 134 of FIG. 6 in that valve 134a includes both a pilot line 164 for measuring the inlet pressure at fan motor 22d and another pilot line 166 which measures fan motor outlet pressure. Thus, reducing valve 134a is sensitive to differential pressure across the fan motor as modulated by the force of spring 140a as determined by engine temperature. Pilot line 166 is required to enable valve 134a to measure pressure drop across the fan because of the presence of downstream hydraulic components 160 which produce a variable pressure resistance downstream of the fan motor as such components are switched on and off.

With the foregoing modifications, however, valve 134a operates in the same manner as described with respect to pressure reducing valve 134 of FIG. 6 to regulate the pressure drop across the fan motor and thus fan speed. In FIG. 7 as shown, variable-displacement pump 122a delivers a relatively constant pressure within a small pressure range, and the pump pressure compensator setting would be such that, with all hydraulic components operating, total line pressure would be sufficient to operate all components without affecting the driving capabilities of engine 16d. Of course, pump 122a could also be provided with a variable compensator similar to the one disclosed with respect to FIG. 6 if, for example, the various hydraulic components other than the fan motor developed exceptionally high pressure resistances.

Having described what are presently several preferred embodiments of my invention, it should be apparent to those skilled in the art that the same permit of modification in arrangement and detail.

I claim:

1. A lift truck having:
   a load-lifting means at the front end of said truck;
   a counterweight means defining an air duct extending through said counterweight means at the rear end of said truck;
   propulsion means positioned between said front and rear ends of said truck and forwardly of the main body of said counterweight means;
   a cooling system for cooling said propulsion means; and
   said cooling system including fan means within said air duct mounted independently of said propulsion means.

2. Apparatus according to claim 1 wherein said duct is of curved cross-sectional shape.

3. Apparatus according to claim 1 wherein said duct is of generally circular cross-sectional shape in the portion thereof within which said fan is positioned.

4. Apparatus according to claim 1 wherein said duct diminishes progressively in size toward the rear end of said truck.

5. Apparatus according to claim 1 wherein said fan means includes motor means mounted independently of said propulsion means and fan blades adjacent said motor means and within said air duct and driven by said motor means.

6. Apparatus according to claim 1 including radiator means between said propulsion means and said fan means and wherein said air duct extends rearwardly from said radiator means to the rear end of said truck, said fan means having blades extending radially to positions adjacent the periphery of said duct.

7. Apparatus according to claim 1 wherein said cooling system includes radiator means positioned between said fan means and said propulsion means.

8. Apparatus according to claim 7 wherein said fan means includes hydraulic motor means mounted at the rear end of said truck and fan blades driven by said hydraulic motor means, said blades being positioned within said air duct, and said air duct extending through said counterweight means from said radiator means to said blades.

9. Apparatus according to claim 1 wherein said cooling system includes a cooling fan and control means for controlling the speed of said fan independently of the speed of said propulsion means throughout at least a substantial portion of the speed range of said propulsion means.

10. Apparatus according to claim 1 wherein said cooling system comprises:
   a cooling fan within said air duct;
   hydraulic motor means for rotating said fan;
   hydraulic pump means for driving said motor means;
   said propulsion means comprising variable-speed prime-mover means for driving said truck and said pump means;
   passage means defining a hydraulic circuit interconnecting said motor means and said pump means; and
   control means for controlling the speed of said fan in response to changes in temperature of said prime-mover means and independently of changes in the speed of said prime-mover means throughout at least the major intermediate portion of the speed range of said prime-mover means.

11. Apparatus according to claim 1 wherein said cooling system includes a radiator interposed between said propulsion means and said air duct.

12. In a lift truck having:

a load-lifting means at a front end of said truck, an internal combustion engine, a cooling system for cooling said engine including a radiator means and cooling fan means, and counterweight means at a rear end of said truck;

said engine being positioned between the front and rear ends of said truck and forwardly of the main body portion of said counterweight means;

said fan means being spaced rearwardly of said engine;

said radiator means being interposed between said fan means and said engine; and said counterweight means comprising a mass of material defining an air duct extending rearwardly from said radiator means to the rear end of said truck, said cooling fan being positioned within said duct and having blades extending radially to positions adjacent the periphery of said duct.

13. In a lift truck having:

a load-lifting means at a front end of said truck, an internal combustion engine, a cooling system for cooling said engine including a radiator means and cooling fan means, and counterweight means at a rear end of said truck;

said engine being positioned between the front and rear ends of said truck and forwardly of the main body portion of said counterweight means;

said fan means being spaced rearwardly of said engine;

said radiator means being interposed between said fan means and said engine; and said fan means including a hydraulic motor means mounted at the rear end of said truck and fan blades driven by said hydraulic motor means adjacent said motor means said fan means being surrounded by said counterweight means, and air passage means extending through said counterweight means from said radiator means to said fan means.

14. In a lift truck having:

a load-lifting means at a front end of said truck, an internal combustion engine, a cooling system for cooling said engine including a radiator means and cooling fan means, and counterweight means at a rear end of said truck;

said engine being positioned between the front and rear ends of said truck and forwardly of the main body portion of said counterweight means;

said fan means being spaced rearwardly of said engine;

said radiator means being interposed between said fan means and said engine; and said counterweight means including a frontal portion defining a recess for receiving said radiator means and said air duct extending rearwardly from said recess through said counterweight means for receiving said fan means.

15. In a lift truck including:

load-lifting means at the front end thereof, counterweight means at the rear thereof, and an internal combustion engine interposed between said load-lifting means and said counterweight means;

a cooling fan and hydraulic motor means for driving said fan spaced rearwardly of said engine with said fan contained within said counterweight means; and radiator means positioned rearwardly of said engine and forwardly of said fan and hydraulic motor means.

16. Apparatus according to claim 15 wherein said counterweight means includes a frontal portion defining a recess for receiving said radiator means and air duct means extending rearwardly from said recess through said counterweight means, said air duct housing said cooling fan.

17. Apparatus according to claim 15 wherein said fan means draws air from said engine through said radiator toward the rear of said truck.